US008260532B2

(12) United States Patent
Roesser

(10) Patent No.: US 8,260,532 B2
(45) Date of Patent: *Sep. 4, 2012

(54) TRAFFIC PROBE IN-VEHICLE MAP-BASED PROCESS TO REDUCE DATA COMMUNICATIONS AND IMPROVE ACCURACY

(75) Inventor: Robert P. Roesser, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 894 days.

This patent is subject to a terminal disclaimer.

(21) Appl. No.: 11/769,000

(22) Filed: Jun. 27, 2007

(65) Prior Publication Data

US 2009/0005958 A1 Jan. 1, 2009

(51) Int. Cl.
*G06F 19/00* (2011.01)

(52) U.S. Cl. ........ 701/117; 701/408; 701/422; 340/907; 340/933; 340/988

(58) Field of Classification Search .................. 701/117, 701/118, 119, 408, 422; 340/995.13, 933, 340/988, 907
See application file for complete search history.

(56) References Cited

U.S. PATENT DOCUMENTS

| | | | | |
|---|---|---|---|---|
| 6,401,027 | B1 * | 6/2002 | Xu et al. | 701/117 |
| 6,859,726 | B2 * | 2/2005 | Choi | 701/209 |
| 7,050,903 | B1 * | 5/2006 | Shutter et al. | 701/117 |
| 2007/0150185 | A1 * | 6/2007 | Nagase et al. | 701/209 |

* cited by examiner

*Primary Examiner* — Redhwan K Mawari

(57) ABSTRACT

A system and method for combining sequential map segments to aggregate, analyze, and display traffic data collected from one or more probe vehicles located on one or more segments of road are provided. Vehicle travel data generation and storage are provided by a data processing center, partitioning a road into a plurality of connected segments, and calculating an estimate of the time required for a probe vehicle to traverse a particular segment. The calculations are performed by a processor that may be on-board the probe vehicle, and the resulting data are transmitted to the processing center, at which they are aggregated and optionally transmitted to one or more subscriber vehicles.

10 Claims, 2 Drawing Sheets

TRAFFIC PROBE IN-VEHICLE MAP-BASED PROCESS TO REDUCE DATA COMMUNICATIONS AND IMPROVE ACCURACY

TECHNICAL FIELD

The embodiments described herein relate to systems and methods for collecting traffic data using probe vehicles.

BACKGROUND OF THE INVENTION

It is known to use vehicles as probes for measuring traffic conditions in real-time. Each such probe vehicle is equipped with position-determining and communication equipment in order to provide such data as, for example, the vehicle's time, speed, position, and heading, which can then be used to estimate such factors of interest as travel time and traffic speed.

A map segment corresponds to a portion of a road, or one side of the road if the road is divided, lying generally between intersections with other roads or features, such as, for example, geopolitical or other boundaries. Map segments are defined by a map database. The travel time along each map segment is estimated based upon the reported speeds of all probe vehicles traveling on that map segment. Unfortunately, because probe vehicles are distributed substantially randomly, individual map segments may at times be devoid of probe vehicles, such that the needed speed information is not available. This is especially true when there is low probe vehicle penetration and at off-peak times.

For this and other reasons, a need exists for an improved method of collecting traffic data.

SUMMARY OF THE INVENTION

A method of acquiring and storing data useful for generating traffic information includes combining a plurality of sequential map segments associated with a first street to provide a superlink. A processing center is configured and includes a computing device with memory, a wireless transmitter connected to the computing device, and a wireless receiver connected to the computing device. A plurality of probe vehicles are provided, each of which is traveling on map segments of the superlink. The probe vehicles include a global positioning system unit, an on-board data processor, an on-board vehicle speed sensor connected to the processor, and a wireless transmitter connected to the processor. The map segments upon which said probe vehicles are traveling are partitioned into a plurality of connected segments. Each particular connected segment is assigned a unique identifier name. The particular connected segment on which each particular vehicle is traveling is selected from the plurality of connected segments. An estimate of the time required for each vehicle to traverse a particular selected connected segment upon which it travels is determined. Data including the unique identifier name and time required for each vehicle to traverse each of such particular connected segments is transmitted to the processing center where it is stored in the memory.

BRIEF DESCRIPTION OF THE DRAWINGS

Embodiments of the invention may take physical form in certain parts and arrangement of parts, the preferred embodiment of which will be described in detail and illustrated in the accompanying drawings which form a part hereof, and wherein.

DESCRIPTION OF THE PREFERRED EMBODIMENT

With reference to the figures, a system 10 and method are herein described and otherwise disclosed in accordance with a preferred embodiment of the present invention. Broadly, the present invention involves combining sequential map segments to aggregate, analyze, and display traffic data collected from one or more probe vehicles located on one or more of the map segments.

Figure 1:
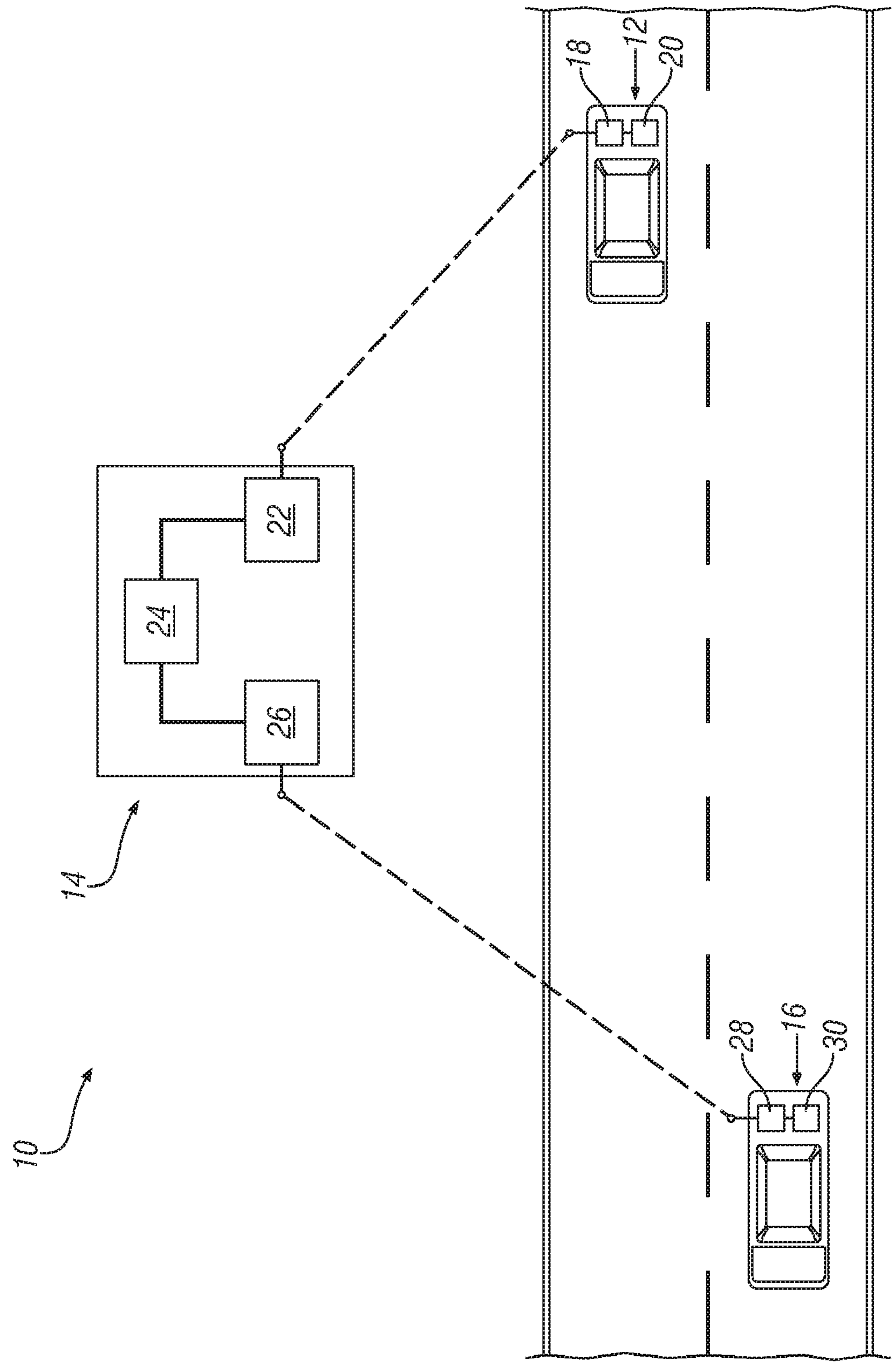
FIG. 1 is a depiction of a preferred embodiment of the system of the present invention.

Referring to FIG. 1, an embodiment of the system 10 is shown broadly comprising one or more probe vehicles 12; a processing center 14 (server); and one or more subscriber vehicles 16. Each probe vehicle 12 broadly comprises a global positioning system (GPS) unit 18 or other position-determining equipment for determining a position of the probe vehicle 12, and a wireless transmitter 20 or other communication equipment for transmitting the position data to the processing center 14. The probe vehicle 12 may also include one or more of any of a variety of different sensors or other data collection equipment for collecting any of a variety of different data which is then also transmitted using the wireless transmitter 20. The processing center 14 implements or otherwise makes use of the method of the present invention to collect and analyze the data provided by the probe vehicle 12, and broadly comprises a wireless receiver 22 or other communication equipment for receiving position and other data transmitted by the probe vehicle 12, a computing device 24 for analyzing the received data and generating traffic data, and a wireless transmitter 26 for transmitting the traffic data to the subscriber vehicle 16. Each subscriber vehicle 16 broadly comprises a wireless receiver 28 for receiving the traffic data transmitted by the processing center 14 and a display device 30 for displaying the received traffic data.

Figure 2:
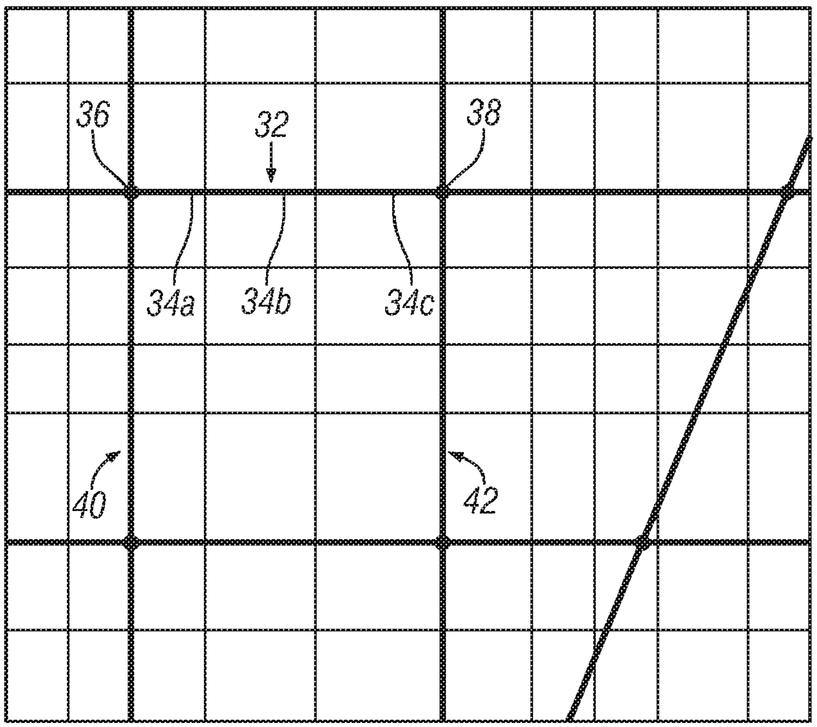
FIG. 2 is a depiction of map segments and combined map segments.

Referring also to FIG. 2, in one embodiment of the present invention, a superlink 32 comprises a plurality of sequential map segments 34*a*, 34*b*, 34*c* along a street of a given name lying between intersections 36,38 with other superlinks 40,42. More specifically, a first superlink 32 begins where the street intersects 36 a second superlink 40 and ends where the street intersects 38 a third superlink 42. Preferably, superlinks 32 are formed only from "through" streets, such as, for example, arterials and freeways. Because the superlink 32 is substantially longer than a single map segment 34*a*,34*b*,34*c* a greater number of probe vehicles 12 can be expected to be traveling on the superlink 32 at any given time.

The method of generating superlinks from a map database may be implemented as follows. This method may be substantially automatically performed, in whole or in part, by a computing device, such as the computing device 24 of the processing center 14, executing a series of instructions that substantially correspond to the steps of the method. In a first embodiment, second and third streets are identified which intersect a first street. The plurality of sequential map segments associated with the first street and located between the intersections is combined to define a superlink.

In a second embodiment, the plurality of sequential map segments are identified extending between an intersection of the first street and the second street and an intersection of the first street and a third street, and the identified plurality of sequential map segments are combined to define the superlink.

In a third embodiment of the method, a set of map segments is identified, wherein each map segment of the set of map segments is associated with a through street having a name. Then, the set of map segments is sorted according to the names of their respective through streets, and, for each through street name, a subset of map segments is identified as being associated with the through street name. Next, for each map segment of each subset of map segments, a longitude range is determined, including a beginning longitude and an ending longitude, and a latitude range is determined, including a beginning latitude and an ending latitude. Then, one or more nodes at which each subset of map segments intersects any other subsets of map segments are identified, resulting in a plurality of such nodes. Next, the plurality of nodes is sorted by the larger of the longitude range or the latitude range of each map segment associated with one or more nodes of the plurality of nodes. Then, for each pair of adjacent nodes of the plurality of nodes, the plurality of map segments extending between the pair of adjacent nodes are determined, and the plurality of map segments are combined to define the superlink.

As mentioned, in each of the foregoing embodiments the first street is preferably a through street. Furthermore, the second and third streets are preferably through streets as well.

Once a superlink has been generated, the data received from one or more probe vehicles traveling on one or more of the plurality of map segments associated with the superlink is aggregated. Traffic data based on the aggregated data is generated, and the traffic data is then transmitted to one or more subscriber vehicles.

According to particular embodiments, GPS data is sampled from each participating probe vehicle 12 at specified time intervals, as desired, which may be on the order of once per minute. The data so sampled are temporarily stored, and subsequently transmitted as a batch to the processing center 14, which combines all such data, including data from a plurality of probe vehicles, over a longer time and provides estimates of traffic conditions throughout the road network superlink.

Due to communication cost limitations, which increase substantially with shorter sampling times, one must settle at a reasonable point in the trade off between cost and quality of map matching reliability. Thus, it would be highly desirable to provide an improved scheme for reducing communication costs, to enable higher quality map matching.

According to a preferred embodiment, the traffic-estimation process is moved, with modification, from the processing center 14 to the individual vehicles, to reduce the amount of transmitted information and to improve accuracy. In this embodiment, the amount of transmission is reduced for two reasons. First, there are fewer inherent variables to be transmitted. Secondly, it can be done selectively. In such a scheme accuracy is improved both because the sampling rate can be greatly increased without incurring increased communication costs, and it benefits certain parts of the algorithm, e.g. map matching, when done onboard the probe vehicle 12.

One part of the onboard process is map matching, which is necessary to determine which link and where on the link that each sample falls, in the face of various errors which may be present in GPS position coordinates. By performing the process onboard, a higher sampling rate is feasible, which significantly improves accuracy, especially when continuity of samples is brought in to play. Furthermore, dead-reckoning using onboard sensors, e.g. yaw rate, distance, compass, etc, adds considerably to map-matching accuracy.

Figure 3:
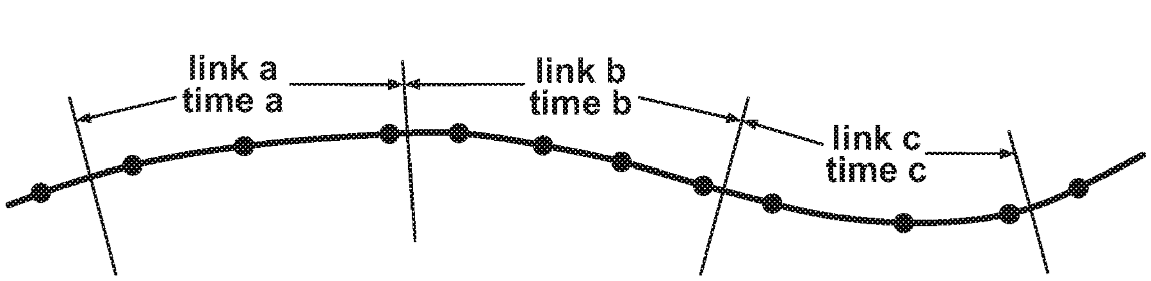
FIG. 3 shows several connected map segments or links along a stretch of road.

In FIG. 3 there are shown several connected segments or "links" (link a, link b, link c) of a road. In FIG. 3, points at which position and motion (including speed) data may be sampled by a probe vehicle are shown as dots within each of the several segments or links. The time to travel a particular link ("link time") is an important parameter, and in one embodiment may be estimated by first determining the closest sample point to each endpoint of the individual segments. The time of day and vehicle speed are recorded at each of the endpoints. Then, the difference between the timestamps of the two samples is computed, and subsequently the time difference is proportioned by multiplying it by the ratio of the link length to the distance between the two sample points. The lengths of these segments/links may be any length desired or convenient for computational or other purposes, and the number of data sampling points along a given segment or link may be any number, but is at least two. In one embodiment, these data are sampled one time per mile of road traveled. In another embodiment, they are sampled at least two times per mile of road traveled. In another embodiment, they are sampled one time for every five miles of road traveled. In a further embodiment, they are sampled one time for every ten miles of road traveled.

An alternate embodiment for estimating link time comprises averaging the recorded speed at each sample point along a particular link, and next dividing the link length by the computed average speed. Once link time is estimated, link speed is easily computed by dividing link length by link time.

The estimated link time (or alternatively link speed) along with an assigned link ID is then transmitted to the processing center 14, which integrates this information with that from other vehicles. Thus, only two variables are transmitted per link, as compared with five variables collected for each of many samples per link. In a preferred embodiment, the server periodically broadcasts to each vehicle an indication of whether data is needed for each link, which the vehicle uses as a command to selectively transmit estimated data.

The segments of road specified as links in FIG. 3 may correspond directly to basic map links as defined by a commercial map database, or they might represent an aggregation of map links, referred to as "superlinks". In the former case, the onboard processor would require storage of the relatively large commercial database; whereas in the latter case, only the storage of a much reduced database consisting of the coarse superlink network is necessary. Additionally, the segments of road specified as links in FIG. 3 may simply be segments of any road that has been partitioned (arbitrarily or otherwise) into a plurality of connected segments.

From the preceding description it will be understood and appreciated that the present embodiments may provide, in some instances, a number of advantages over the prior art, including, for example, relaxing the penetration requirement for probe vehicles, improving the estimation of travel time and increasing the coverage for a given pool of probe vehicles, making traffic data more manageable, facilitating the analysis of traffic data, and simplifying the display of traffic data for drivers.

Although the present invention has been described with reference to the preferred embodiments illustrated in the drawings, it is noted that equivalents may be employed and substitutions made herein without departing from the scope of the invention as recited in the claims. Thus, for example, it will be understood and appreciated by those with ordinary skill in the relevant art that alternative methods may exist for generating the superlinks of the present invention.

While the invention has been described by reference to certain preferred embodiments, it should be understood that changes can be made within the spirit and scope of the inventive concepts described. Accordingly, it is intended that the invention not be limited to the disclosed embodiments, but that it have the full scope permitted by the language of the following claims.

The invention claimed is:

1. A method of acquiring and storing data useful for generating traffic information, the method comprising:

combining a plurality of sequential map segments associated with a first street to provide a superlink, said superlink extending between an intersection with a second street and an intersection with a third street, wherein said plurality of sequential map segments are located between the intersection with the second street and the intersection with the third street, wherein combining a plurality of sequential map segments includes:

identifying a set of map segments, wherein each map segment of the set of map segments is associated with a through street, and wherein each through street has a name;

sorting the set of map segments according to the names of their respective through streets, and identifying, for each through street name, a subset of map segments associated with the through street name;

determining, for each map segment of each subset of map segments, a longitude range including a beginning longitude and an ending longitude, and a latitude range, including a beginning latitude and an ending latitude;

identifying one or more nodes at which each subset of map segments intersects all other subsets of map segments, resulting in a plurality of nodes;

sorting the plurality of nodes by the larger of the longitude range or the latitude range of each map segment associated with one or more nodes of the plurality of nodes; and determining, for each pair of adjacent nodes of the plurality of nodes, the plurality of map segments extending between the pair of adjacent nodes, and combining the plurality of map segments;

configuring a processing center, said processing center comprising:

a computing device, comprising a memory;

a wireless transmitter connected to said computing device; and a wireless receiver connected to said computing device;

providing a plurality of probe vehicles, wherein each of said probe vehicles are traveling on map segments of said superlink, said probe vehicles each comprising:

a global positioning system unit;

an on-board data processor;

an on-board vehicle speed sensor connected to said processor;

a wireless transmitter connected to said processor;

partitioning the map segments upon which said probe vehicles are traveling into a plurality of connected segments;

assigning each particular connected segment a unique identifier name;

selecting the particular connected segment on which each particular vehicle is traveling from said plurality of connected segments;

determining an estimate of the time required for each vehicle to traverse a particular selected connected segment upon which it travels;

transmitting data that comprises said unique identifier name and time required for each vehicle to traverse each of such particular connected segments to said processing center; and storing said data in said memory.

2. The method according to claim 1 wherein partitioning the map segments is performed in an on-board processor of a probe vehicle.

3. The method according to claim 1 wherein selecting a particular connected segment from the plurality of connected segments is performed in an on-board processor of a probe vehicle.

4. The method according to claim 1 wherein determining an estimate of the time required for each vehicle to traverse a particular connected segment upon which it travels is performed by calculation in the on-board processor of a probe vehicle.

5. The method according to claim 4 wherein said calculation includes:

identifying the beginning and end points of a given connected segment;

determining the length of said given connected segment;

sampling position and motion data of the vehicle at a plurality of points disposed between the beginning and end points of said given connected segment;

determining a first sample point which is closest to the beginning point of said connected segment;

determining a second sample point which is closest to the end point of said connected segment;

calculating the distance between the first and second sample points;

computing the difference between the timestamps of the first and second sample points to arrive at a travel time; and multiplying the travel time by the ratio of the length of said connected segment to the distance between the first and second sample points.

6. The method according to claim 4 wherein said calculation includes:

identifying the beginning and end points of a given connected segment;

determining the length of said given connected segment;

sampling position and speed data at a plurality of points disposed between the beginning and end points of said given connected segment;

calculating an average speed by averaging the speed recorded at each sample point along the particular connected segment; and calculating the time required for traversing said connected segment by dividing the length of said segment by said average speed.

7. The method according to claim 4, wherein combining the plurality of sequential map segments includes:

identifying the second street and the third street which intersect the first street, wherein the plurality of sequential map segments are located between the intersections; and combining the plurality of sequential map segments located between the intersections.

8. The method according to claim 7, wherein at least the first street is a through street.

9. The method according to claim 8, wherein the second and third streets are through streets.

10. The method according to claim 4, wherein combining the plurality of sequential map segments includes:

identifying the plurality of sequential map segments associated with the first street and extending between an intersection with a second street and an intersection with a third street; and combining the plurality of sequential map segments.

* * * * *